(12) United States Patent
Yang et al.

(10) Patent No.: US 8,310,463 B2
(45) Date of Patent: Nov. 13, 2012

(54) CAPACITIVE TOUCH PANEL WITH LOW COUPLING CAPACITANCE AND DISPLAY DEVICE USING THE CAPACITIVE TOUCH PANEL

(75) Inventors: Tun-Chun Yang, Hsin-Chu (TW); Seok-Lyul Lee, Hsin-Chu (TW); Chih-Jen Hu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 668 days.

(21) Appl. No.: 12/240,045

(22) Filed: Sep. 29, 2008

(65) Prior Publication Data

US 2009/0084613 A1 Apr. 2, 2009

(30) Foreign Application Priority Data

Sep. 28, 2007 (TW) .................. 96136433 A (51) Int. Cl.
*G06F 3/041* (2006.01)
*G06F 3/045* (2006.01)
(52) U.S. Cl. ........................ 345/174; 345/173
(58) Field of Classification Search .... 178/18.01–20.04; 345/173–178; 382/115–127; 200/600
See application file for complete search history.

(56) References Cited

U.S. PATENT DOCUMENTS

| 4,087,625 A * | 5/1978 | Dym et al. ................. 178/18.06 |
| 4,550,221 A | 10/1985 | Mabusth |
| 5,113,041 A * | 5/1992 | Blonder et al. ............... 345/173 |
| 5,886,687 A | 3/1999 | Gibson |
| 6,970,160 B2 * | 11/2005 | Mulligan et al. .............. 345/173 |
| 7,109,978 B2 | 9/2006 | Gillespie et al. |
| 2006/0071889 A1 | 4/2006 | Yang et al. |
| 2006/0097991 A1 * | 5/2006 | Hotelling et al. ............. 345/173 |
| 2006/0132462 A1 | 6/2006 | Geaghan |
| 2007/0229470 A1 | 10/2007 | Snyder et al. |
| 2008/0062140 A1 * | 3/2008 | Hotelling et al. ............. 345/173 |
| 2011/0018841 A1 | 1/2011 | Hristov |
| 2012/0154332 A1 * | 6/2012 | Chang et al. .................. 345/174 |

FOREIGN PATENT DOCUMENTS

| CN | 1855011 | 11/2006 |
| TW | 200712998 | 4/2007 |
| TW | I285277 | 8/2007 |

OTHER PUBLICATIONS

Chinese language office action dated Dec. 26, 2008.
English language translation of abstract and pertinent parts of CN 1855011, dated Apr. 29, 2005.
Taiwan Office Action dated Apr. 15, 2011.

* cited by examiner

*Primary Examiner* — Bipin Shalwala
*Assistant Examiner* — Ryan A Lubit
(74) *Attorney, Agent, or Firm* — McClure, Qualey & Rodack, LLP (57) ABSTRACT

A capacitive touch panel and a display device using the capacitive touch panel are provided. The capacitive touch panel includes a plurality of first direction electrode strings and second direction electrode strings. Each first direction electrode string has a plurality of first electrodes while each second direction electrode has a plurality of second electrodes. In order to reduce the lateral capacitance between adjacent electrodes, width of the first electrode is reduced from the middle to two sides of the electrode along a second direction. In addition, the first electrode has a perimeter surrounding itself. Each quarter of the perimeter of the first electrode facing the adjacent second electrode has a first slope change rate and a different second slope change rate.

23 Claims, 13 Drawing Sheets

CAPACITIVE TOUCH PANEL WITH LOW COUPLING CAPACITANCE AND DISPLAY DEVICE USING THE CAPACITIVE TOUCH PANEL

BACKGROUND OF THE INVENTION

1. Field of the Invention

The present invention relates to a capacitive touch panel and a display device using the capacitive touch panel. Specifically, the present invention relates to a capacitive touch panel having low coupling capacitance and a display device using the capacitive touch panel.

2. Description of the Prior Art

Display panels and flat screen display device using the display panels are gradually becoming the mainstream in the field of display devices. For instance, flat television for home use, liquid crystal display of the personal computer or of the laptop computer, display screen of mobile phone and digital camera are products incorporating the display panel as one essential component. As the product design is gradually becoming user-oriented, the usability for the user and the touch input function of the display panel become an emphasis in the development of display device industry.

Figure 1A:
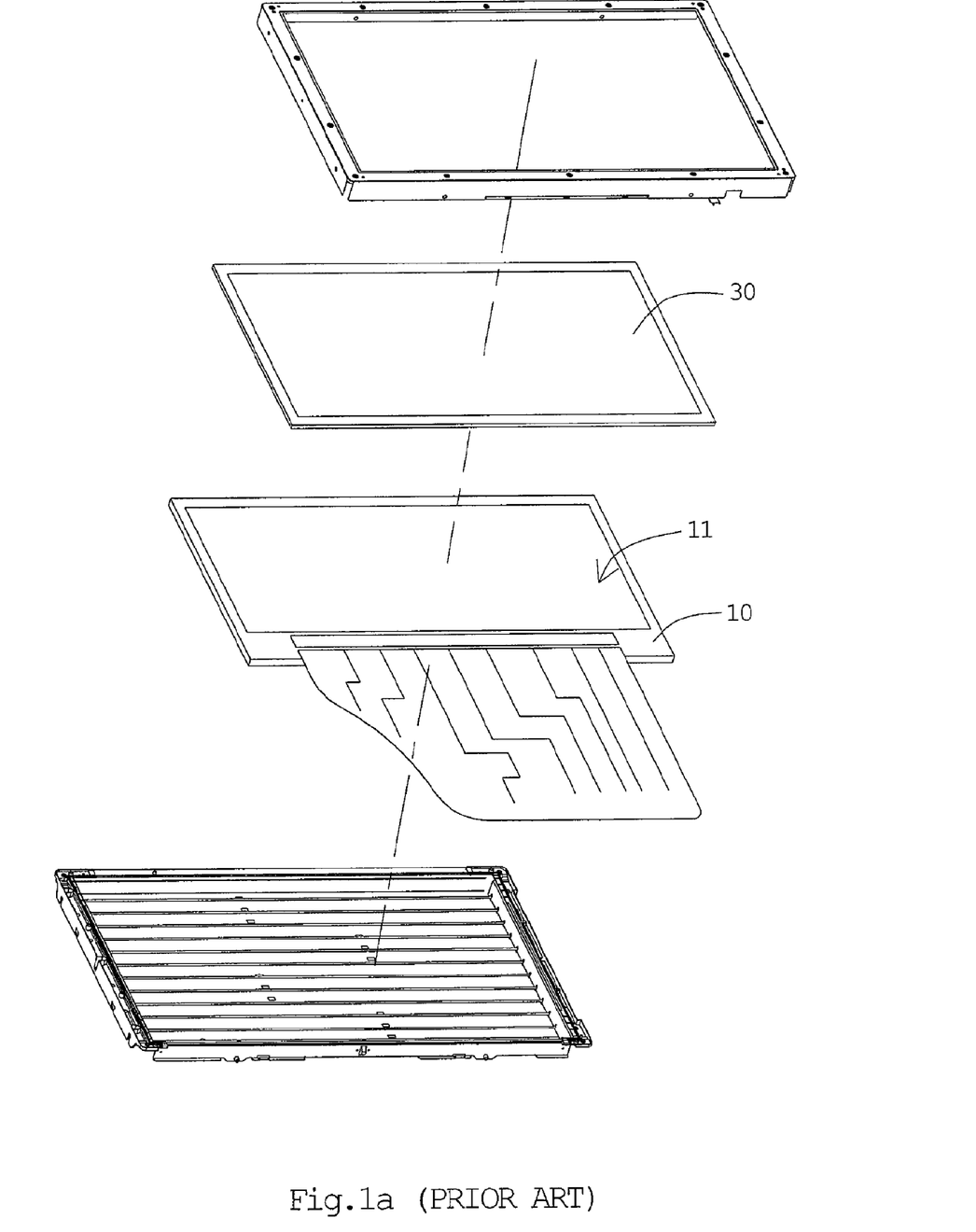
FIG. 1a is the schematic diagram of a conventional touch panel of a display device.

As FIG. 1a shows, a conventional liquid crystal display (LCD) panel with touch-input function includes a display panel 10 and a touch panel 30. The touch panel 30 is disposed on the display surface 11 of the display panel 10. In other words, the images are displayed outwards through the touch panel 30. Currently the majority of touch panel 30 include resistive and capacitive touch panels.

As for the resistive touch panel 30, the operation principle includes using the voltage drop within the resistive touch panel 30 to locate the coordinates of the contact point. The touch panel 30 is composed of an upper layer and a lower layer. The touch panel 30 applies a voltage across the two layers. When the user physically points at the touch panel 30, a conducting loop is created at the contact point. The voltage drop within the conducting loop is used by the system to determine the location of the contact point. However this type of touch panel 30 cannot process multi-input simultaneously and also cannot process fingerprint recognition. Furthermore, a minimum applied pressure is required to create a conducting loop at the contact point, and thus the resistive touch panel 30 is subject to a minimum applied pressure.

Figure 1B:
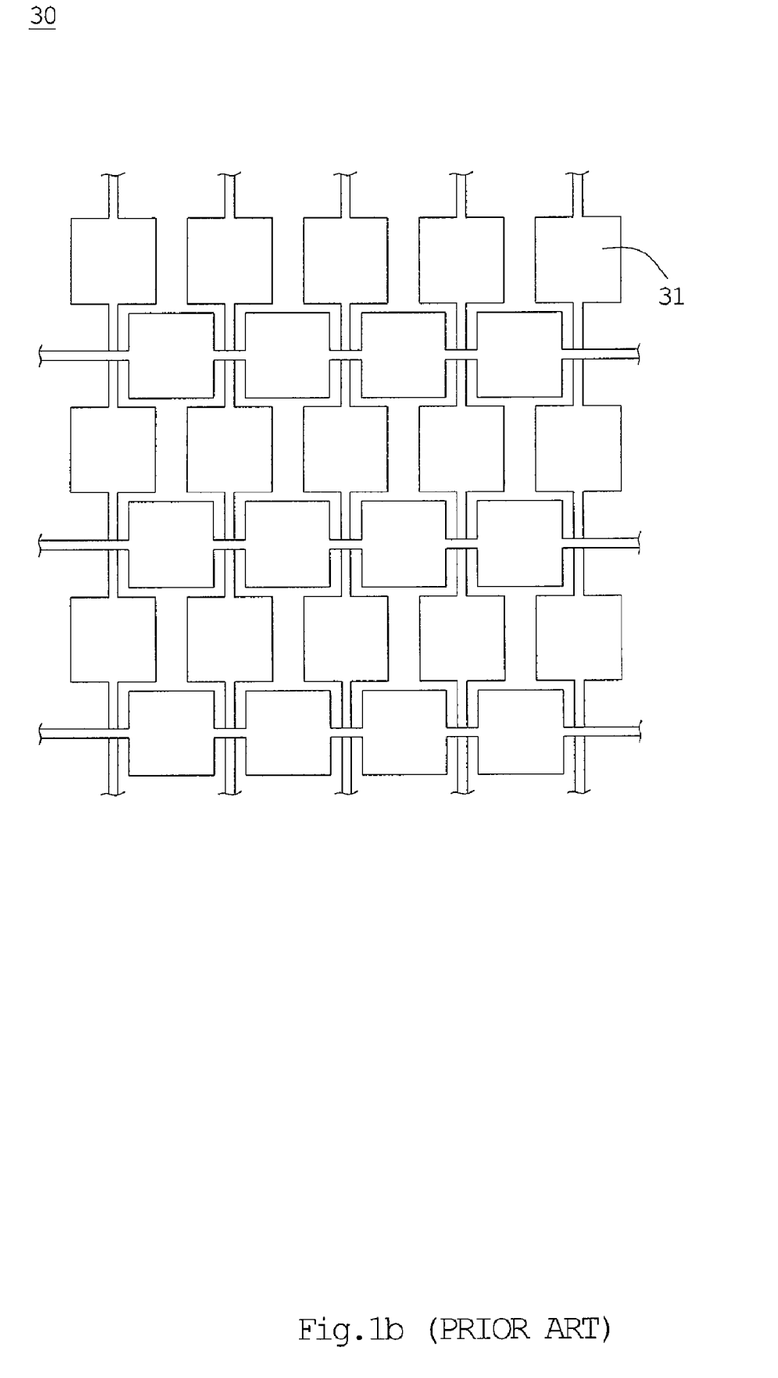
FIG. 1b is the schematic diagram of a conventional capacitive touch panel.

The operation principle of capacitive touch panel 30 is different from that of resistive touch panel 30. As for the conventional capacitive touch panel shown in FIG. 1b, X direction electrodes 31 and Y direction electrodes 31 are disposed at an upper and a lower layer respectively. When the user physically contacts the touch panel 30 with fingers or other conductive objects, a difference in capacitance is created at the touch panel 30. The system will be able to determine the contact point based on the difference in capacitance. As FIG. 1b shows, the conventional capacitive touch panel 30 uses quadrilateral electrodes 31. The lateral sides of electrodes 31 on the same or on different electrode layers have longer effective corresponding length between electrodes 31. The distance between electrodes 31 is not changed and this creates a larger effective overlapping area for creating capacitance between electrodes 31. As the lateral capacitance between electrodes increases, the system's overall coupling capacitance also increases which in turn increases the overall loading of the system.

SUMMARY OF THE INVENTION

It is an objective of the present invention to provide a capacitive touch having lower lateral capacitance between electrodes and lower overall coupling capacitance.

It is another objective of the present invention to provide a capacitive touch panel with a lower system loading.

It is another objective of the present invention to provide a display device incorporating a capacitive touch panel having lower system loading.

The display device of the present invention includes a display panel and a capacitive touch panel. The capacitive touch panel is preferred to be disposed on the display surface of the display panel. The image of the display surface of the display panel is displayed outwards through the capacitive touch panel. When the user physically points at the display surface; the capacitive touch panel is able to detect the location of the contact point and outputs a signal to be processed by the processor.

The capacitive touch panel includes a plurality of first direction electrode strings, a plurality of second direction electrode strings and a dielectric layer. The dielectric layer is disposed between the first direction electrode strings and the second direction electrode strings, and is used to electrically isolate first direction electrode strings and the second direction electrode strings. The first direction electrode strings are distributed along a first direction and the second direction electrode strings are distributed along a second direction. A plurality of first electrodes is disposed on the first direction electrode strings along the first direction. A plurality of second electrodes is disposed on the second direction electrode strings along the second direction.

In order to reduce the lateral capacitance between the adjacent X and the second electrodes or between adjacent first electrodes, the width of the first electrodes is reduced from the middle of the first electrode to two sides of the first electrode along the second direction. This above-mentioned design reduces the effective overlapping area for generating capacitance between first electrodes and the adjacent second electrode or between first electrodes on the adjacent first direction electrode strings. This reduction in the effective overlapping area in turn reduces the lateral capacitance between electrodes.

Each of the first electrodes has a perimeter forming the shape of the first electrode. Each first electrode is surrounded by four adjacent second electrodes at four corners of the first electrode. If the perimeter is divided into four quarters by an imaginary vertical line and a horizontal line passing through the first electrode; then every quarter of the divided perimeter will face one of the above-mentioned adjacent second electrodes. Each quarter of the perimeter facing the adjacent second electrode includes a first slope change rate and a different second slope change rate. This perimeter design reduces the effective overlapping area for generating capacitance between first electrodes and the adjacent second electrode or between first electrodes on the adjacent first direction electrode strings. The reduction in this effective overlapping area in turn reduces the lateral capacitance between electrodes.

DETAILED DESCRIPTION OF THE PREFERRED EMBODIMENT

The present invention provides a capacitive touch panel and a display device using the capacitive touch panel. The said display device includes flat panel display devices using display panels but is not limited thereto. Furthermore, the liquid crystal display panel includes transmissive liquid crystal display panels, reflective liquid crystal display panels, transflective liquid crystal display panels and other types of liquid crystal display panels.

Figure 2:
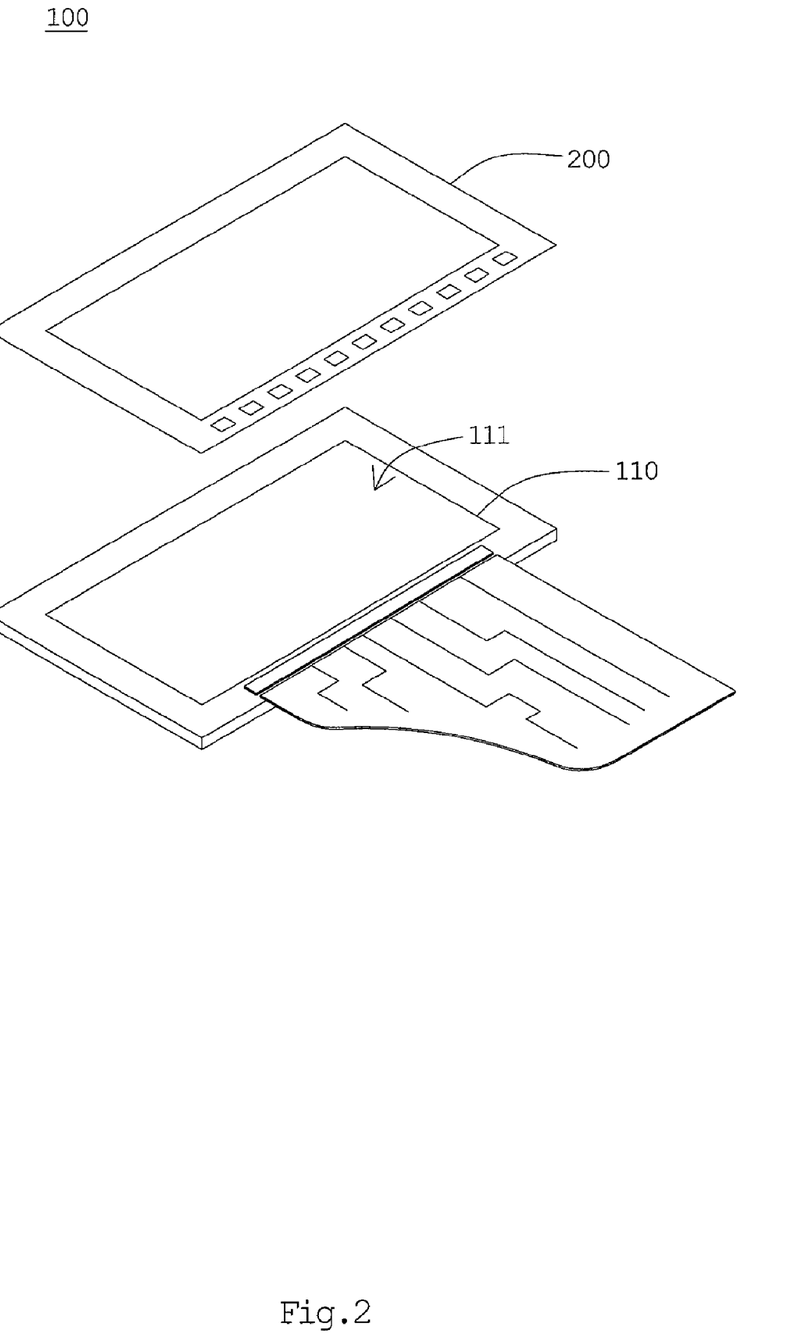
FIG. 2 is a schematic diagram of an embodiment of the display device according to the present invention.

In the embodiment shown in FIG. 2, the display device 100 includes a display panel 110 and a capacitive touch panel 200. The capacitive touch panel 200 is preferred to be disposed on a display surface 111 of the display panel 110. The images on the display surface 111 of the display panel 100 are displayed outwards through the capacitive touch panel 200. When the user physically points at the displayed images on the display surface 111. The capacitive touch panel 200 determines the contact point by the user and outputs a signal to be processed by a back-end processor. However, in different embodiments, the capacitive touch panel 200 of the present invention is not limited to the only use in the display device 100 and can also be incorporated into other devices which require touch input capability.

Figure 3:
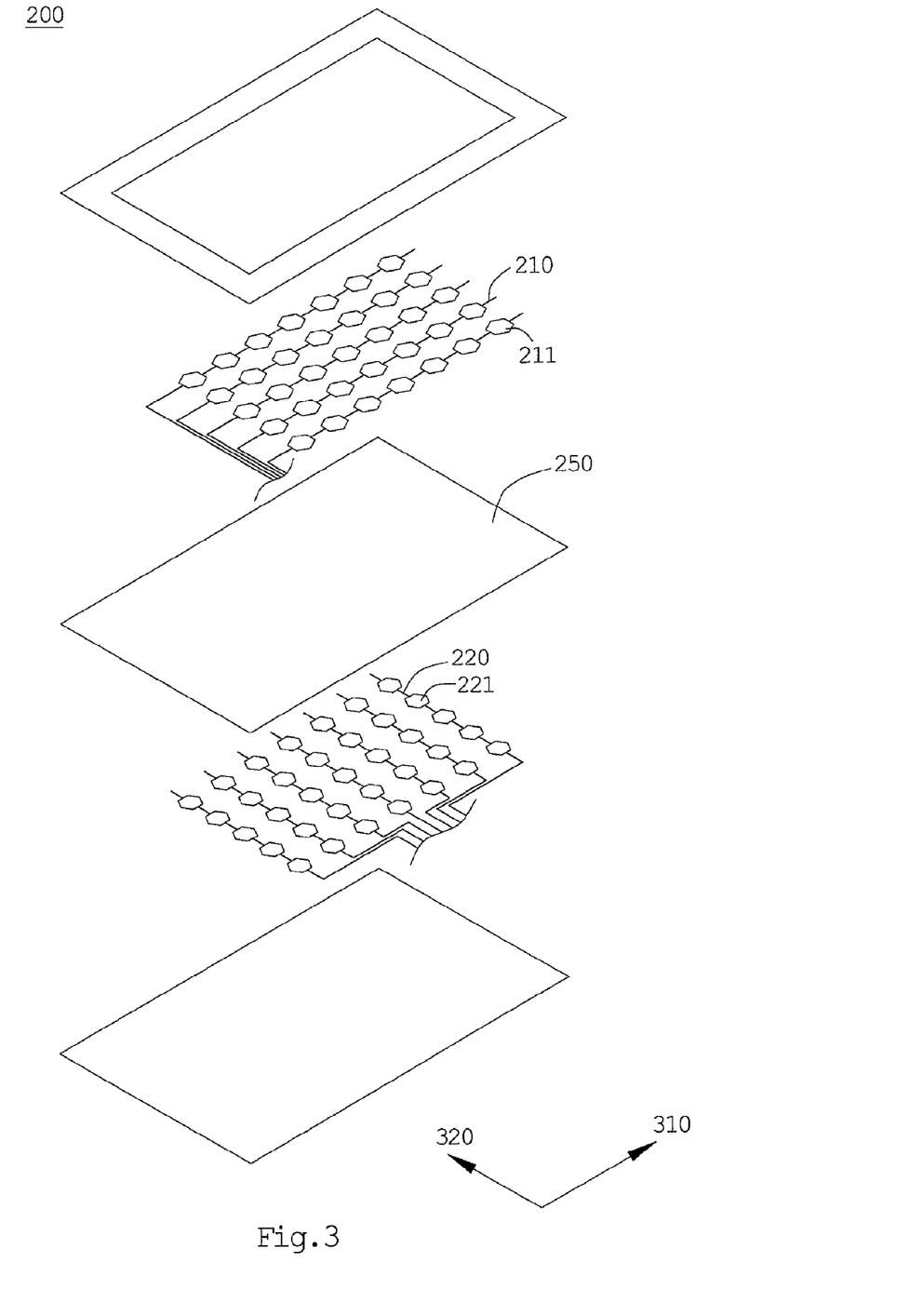
FIG. 3 is an exploded diagram of an embodiment of the capacitive touch panel according to the present invention.

As FIG. 3 shows, the capacitive touch panel 200 includes a plurality of first direction electrode strings 210, a plurality of second direction electrode strings and a dielectric layer 250. The dielectric layer 250 is disposed between the first direction electrode strings 210 and the second direction electrode strings 220 to electrically isolate these electrode strings. The first direction electrode strings 210 is extended along a first direction 310 and the second direction electrode strings is extended along a second direction 320. In the present embodiment, the first direction 310 is preferred is be orthogonal to the second direction 320. However, in different embodiments, the first direction 310 may cross the second direction 320 in degree other than 90 degree.

Figure 4:
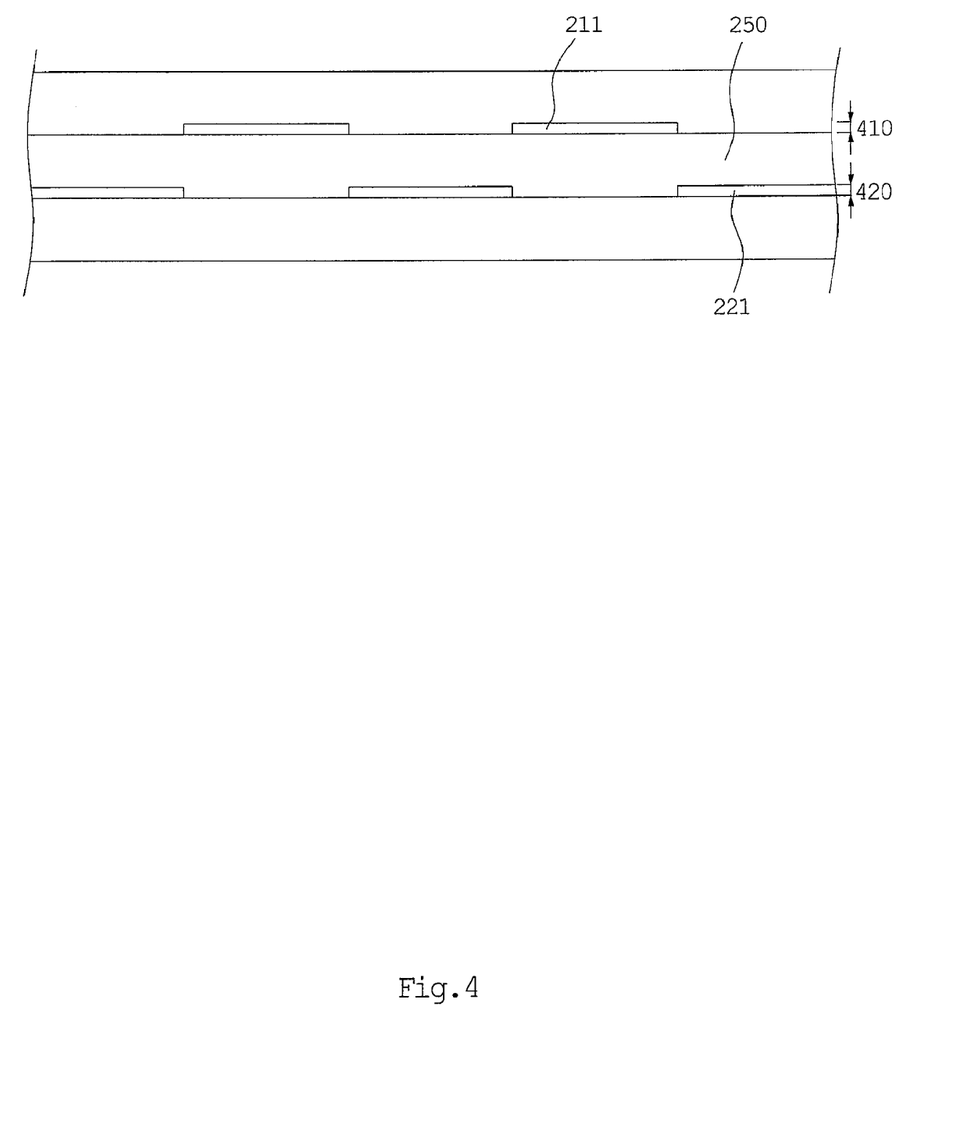
FIG. 4 is a sectional view of an embodiment of the capacitive touch panel according to the present invention.

As FIG. 3 shows, a plurality of first electrodes 211 are disposed along the first direction 310 on the first direction electrode strings 210. A plurality of second electrodes 221 are disposed along a second direction 320 on the second direction electrode strings 220. As it can be seen from the sectional view of FIG. 4, the first direction electrode strings 210 and first electrodes 211 are part of a first electrode layer 410; the second electrode strings 220 and second electrodes 420 are part of a second electrode layer 420. The first electrode layer 410 overlaps the top of the second electrode layer 420; the dielectric layer 250 is disposed between the first electrode layer 410 and the second electrode layer 420 to provide the required signal isolation between two electrode layers.

Figure 5:
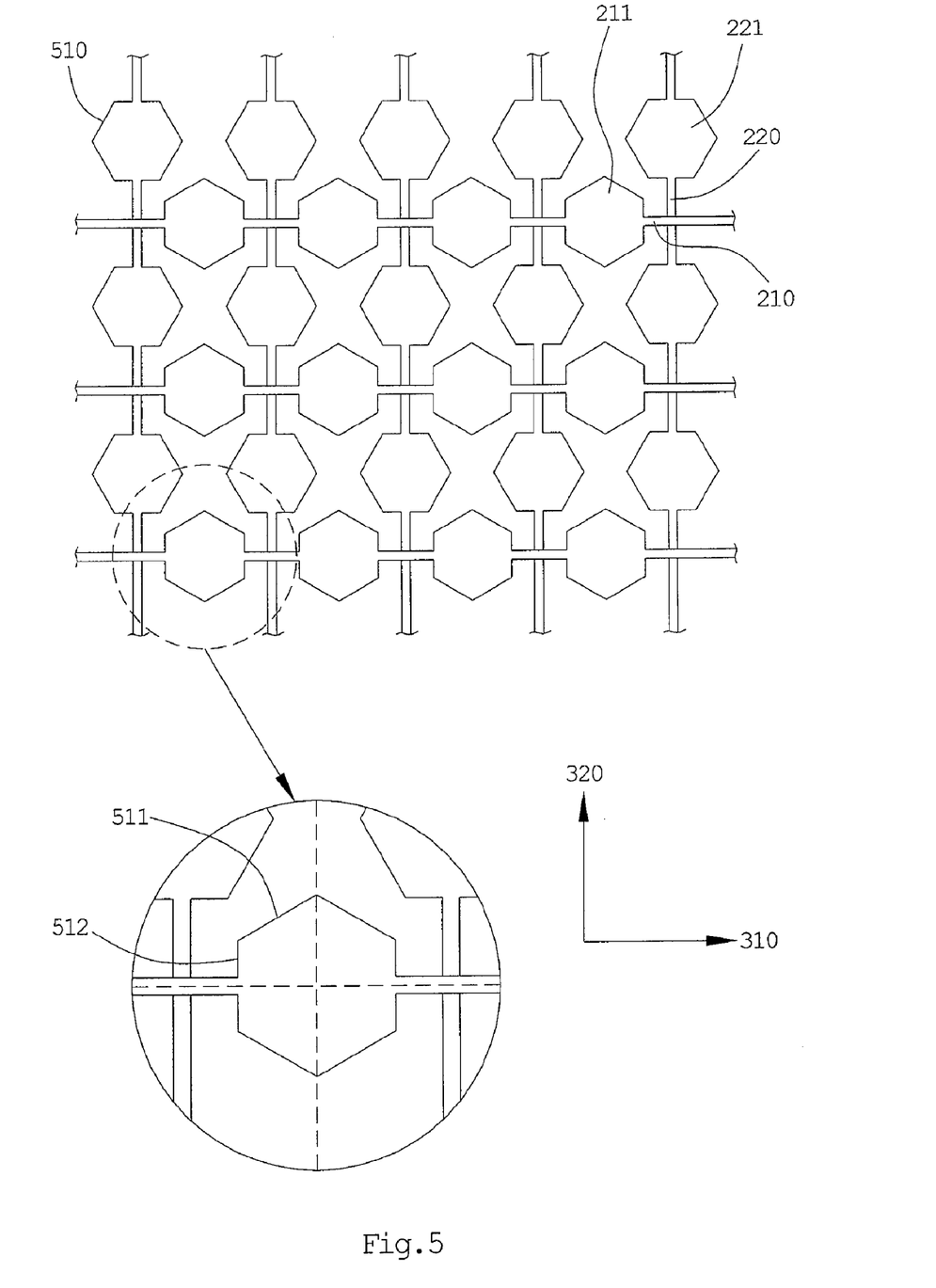
FIG. 5 is a top view of an embodiment of the capacitive touch panel according to the present invention.

As it can be seen from the top view of FIG. 5, the first direction 210 and the second direction 220 interlace to form a grid structure. In other words, the first direction electrode strings 210 and the second direction electrode strings 220 cross each other with the dielectric layer 250 disposed between them. As FIG. 5 shows, except for the electrodes disposed around the edges, each of the first electrodes 211 is disposed between the adjacent second direction electrode strings 220; each of the second electrodes 221 is disposed between the adjacent first direction electrode strings 210. The first electrodes 211 and the second electrodes 221 are distributed in a hive shape on the capacitive touch panel 200. Each of the first electrodes 211 is disposed between four second electrodes disposed in a 2 by 2 matrix; each of the second electrodes 221 is disposed between four first electrodes 211 disposed in a 2 by 2 matrix.

As FIG. 5 shows, in order to reduce the lateral capacitance between the adjacent first electrodes 211 and the adjacent second electrodes 221, width of the first electrode 211 is reduced from the middle of the first electrode 211 to two sides of the first electrode 211 along the second direction 320. In other words, the section of the first electrode 211 distant from the middle of the first electrode 211 and stretching into the space between the two adjacent second electrodes will have width smaller than the middle section of the first electrode 211. This design reduces the effective overlapping area for generating lateral capacitance between first electrode 211 and adjacent second electrodes 221 or between first electrode 211 and first electrodes 211 on the adjacent first direction electrode strings 210. In this way, the lateral capacitance between electrodes is also decreased. In the present embodiment, the closest distance between the first electrode 211 and the second electrodes 221 or the closest distance between two adjacent first electrodes 211 lies in between 1 and 1000 micrometers, wherein the distance between 10 and 100 micrometers is preferred.

As FIG. 5 shows, each of the first electrodes 211 has a perimeter 510 which forms the shape of the first electrode 211. The four corners of first electrode 211 are surrounded by four adjacent second electrodes 221. If the perimeter of first electrode 211 is divided into four quarters by an imaginary vertical line and an imaginary horizontal line, each quarter of the divided perimeter 510 respectively faces the four adjacent second electrodes 221. In the present embodiment, every quarter of perimeter 510 facing the adjacent second electrode 221 has a first slope change rate and a second slope change rate. In other words, every quarter of perimeter 510 will include at least two line segments with different slope change rates. The slope change rate is the rate of unit length change in slope and its value can be any real number from 0, close to 0 to limits such as infinitely small or infinitely large. The perimeter 510 design reduces the effective overlapping area for generating lateral capacitance between first electrodes 211 and adjacent second electrode 221 or between first electrodes 211 and first electrodes 211 on the adjacent first direction electrode strings. In this way, the lateral capacitance between electrodes is also decreased.

As FIG. 5 shows, the first electrode 211 has the shape of a regular hexagon. The quarter of perimeter 510 facing the upper left adjacent second electrode 221 can be divided into a first line segment 511 and a second line segment 512. In the present embodiment, the first line segment 511 and the second line segment 512 are both straight line segments. The slopes of the two line segments are both fixed value and thus have a slope change rate of 0. However, joint of the first line segment 511 and the second line segment 512 is a point and thus the slope change rate at the point can be regarded as close to infinity. The quarter of perimeter 510 therefore has two different slope change rate.

Figure 6A:
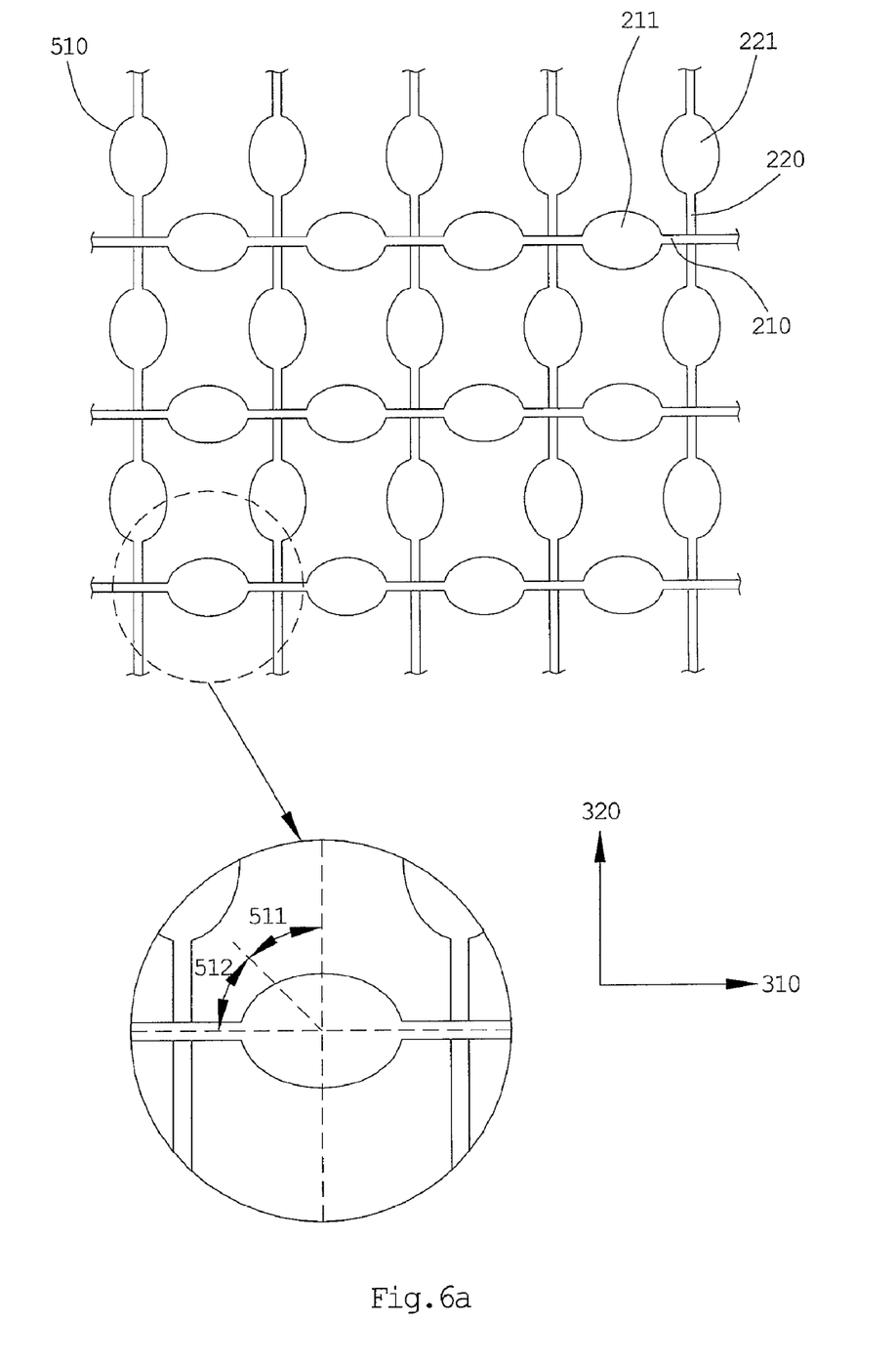
FIG. 6a, FIG. 6b and FIG. 6c are top views of variation embodiments of the capacitive touch panel according to the present invention.

In the embodiment shown in FIG. 6a, the first electrode 211 is oval-shaped, the quarter of perimeter 510 facing the upper left adjacent second electrode 221 is divided into a first line segment 511 and a second line segment 512. In the present embodiment, the first line segment 511 and the second line segment 512 are both arc-shaped line segments. The curvatures of two line segments change along the first direction 310. The quarter of perimeter 510 has at least a first curvature change rate and a second curvature change rate.

Figure 6B:
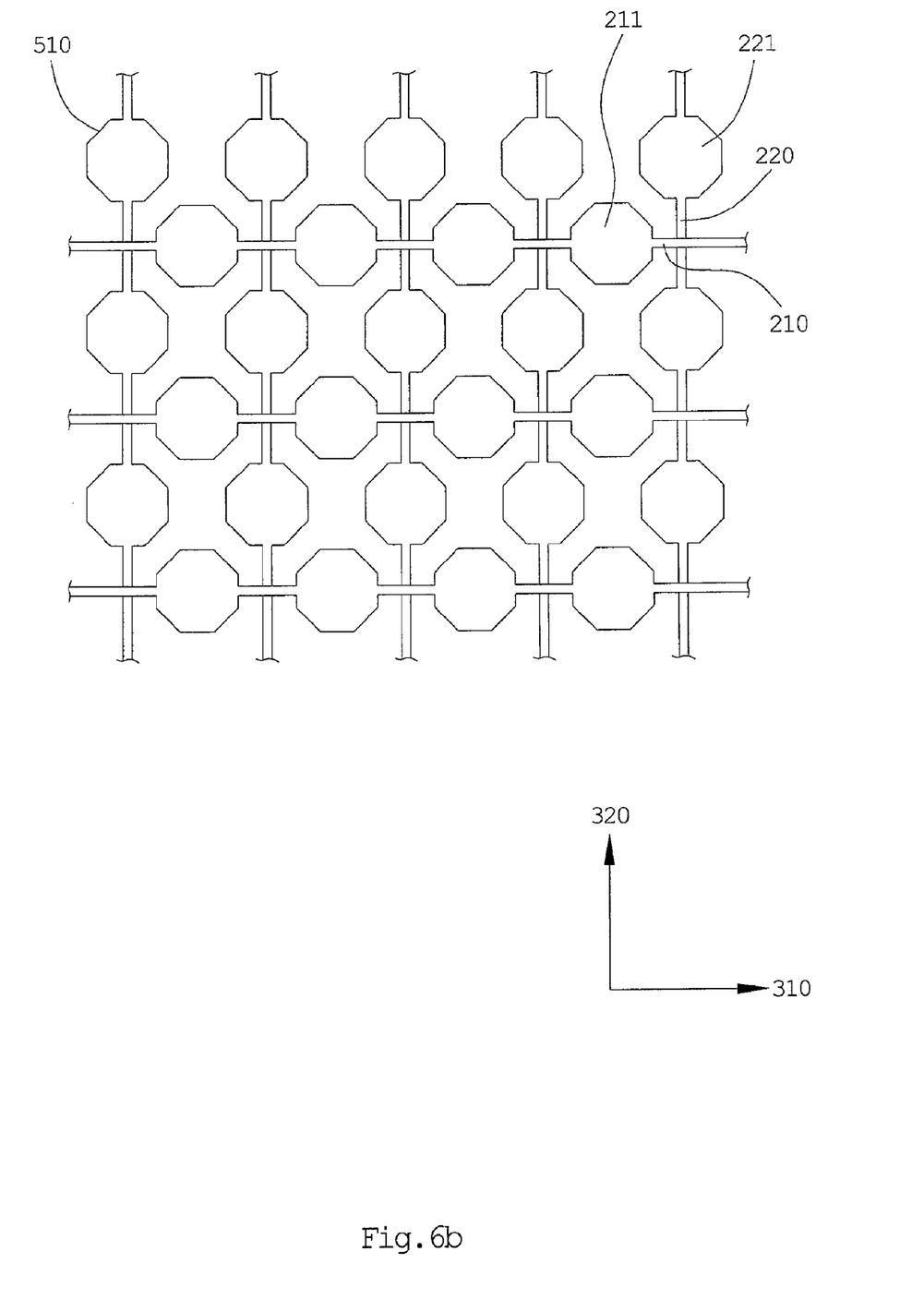
Figure 6C:
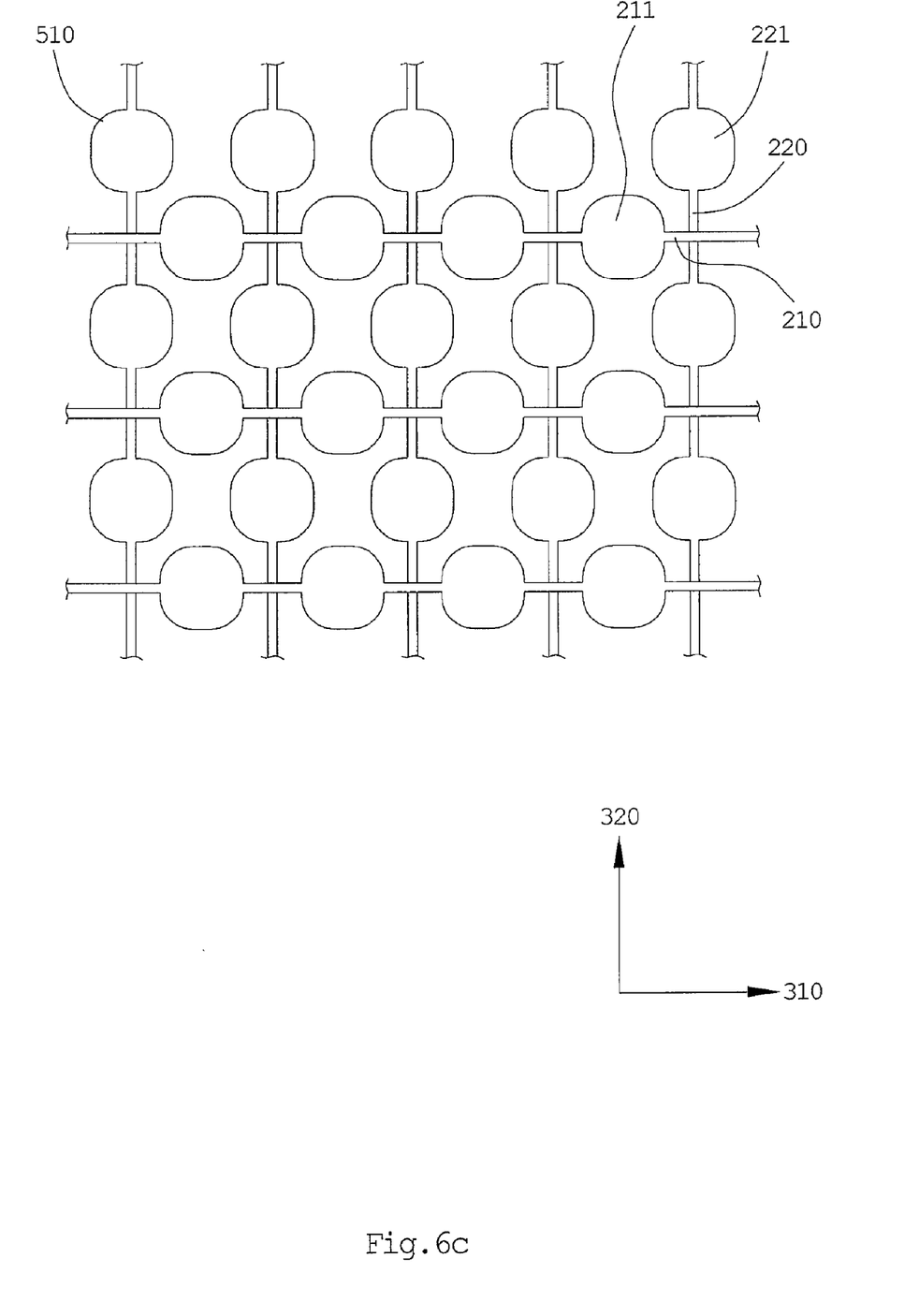

In addition to hexagon, the first electrode 211 can also include polygons other than quadrilateral and is not limited to only regular polygons. In the embodiment shown in FIG. 6b, the first electrode 211 is octagon-shaped. Furthermore, the first electrode 211 may have other shapes such as a shape of perfect circle or of an irregular polygon. In the embodiment shown in FIG. 6c, the perimeter 510 of first electrode 211 simultaneously has a straight line segment and an arc-shaped line segment, and thus the first electrode 211 is shaped between polygon and circle.

Figure 7A:
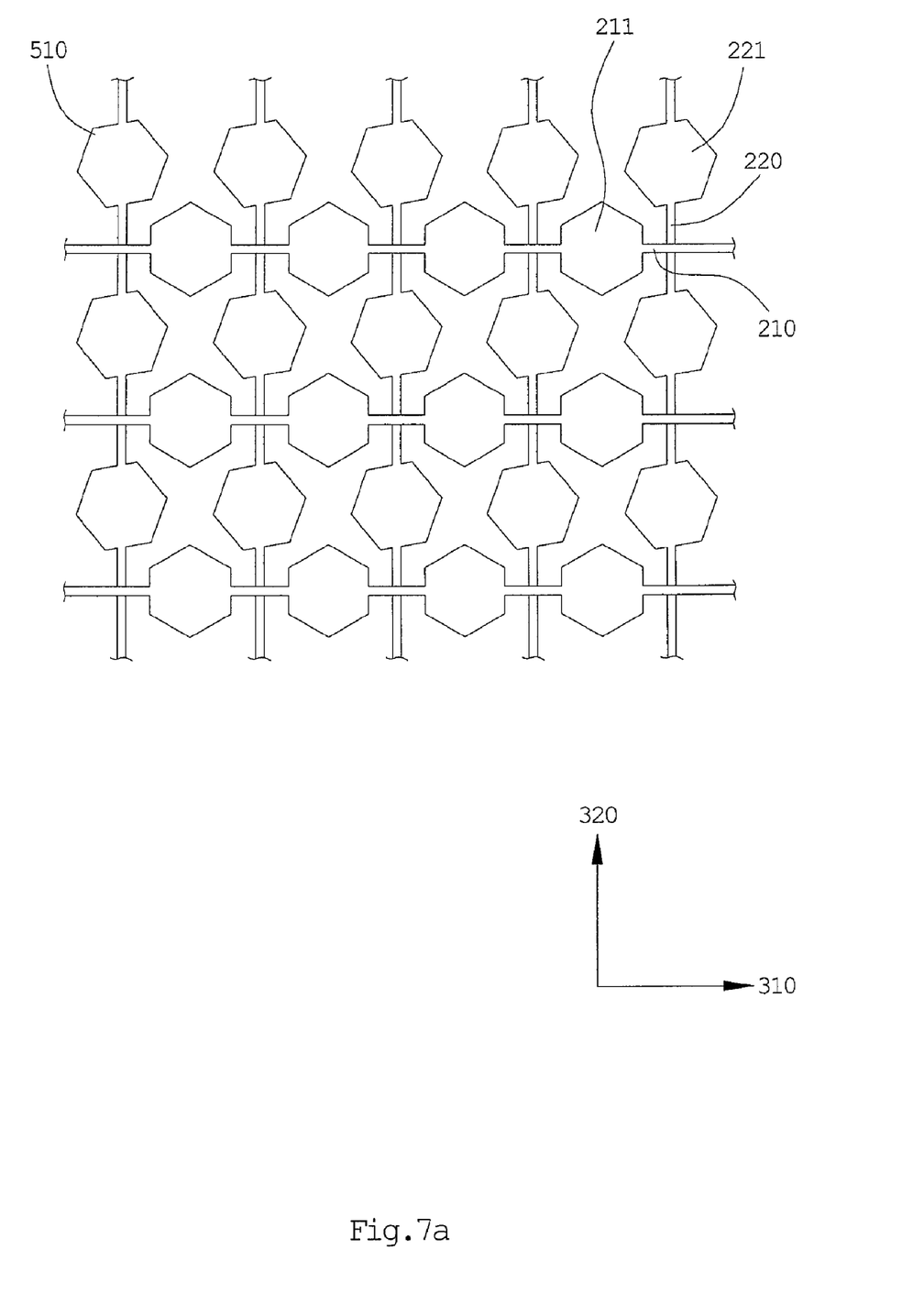
FIG. 7a and FIG. 7b are top views of the embodiment of rotated electrodes according to the present invention.
Figure 7B:
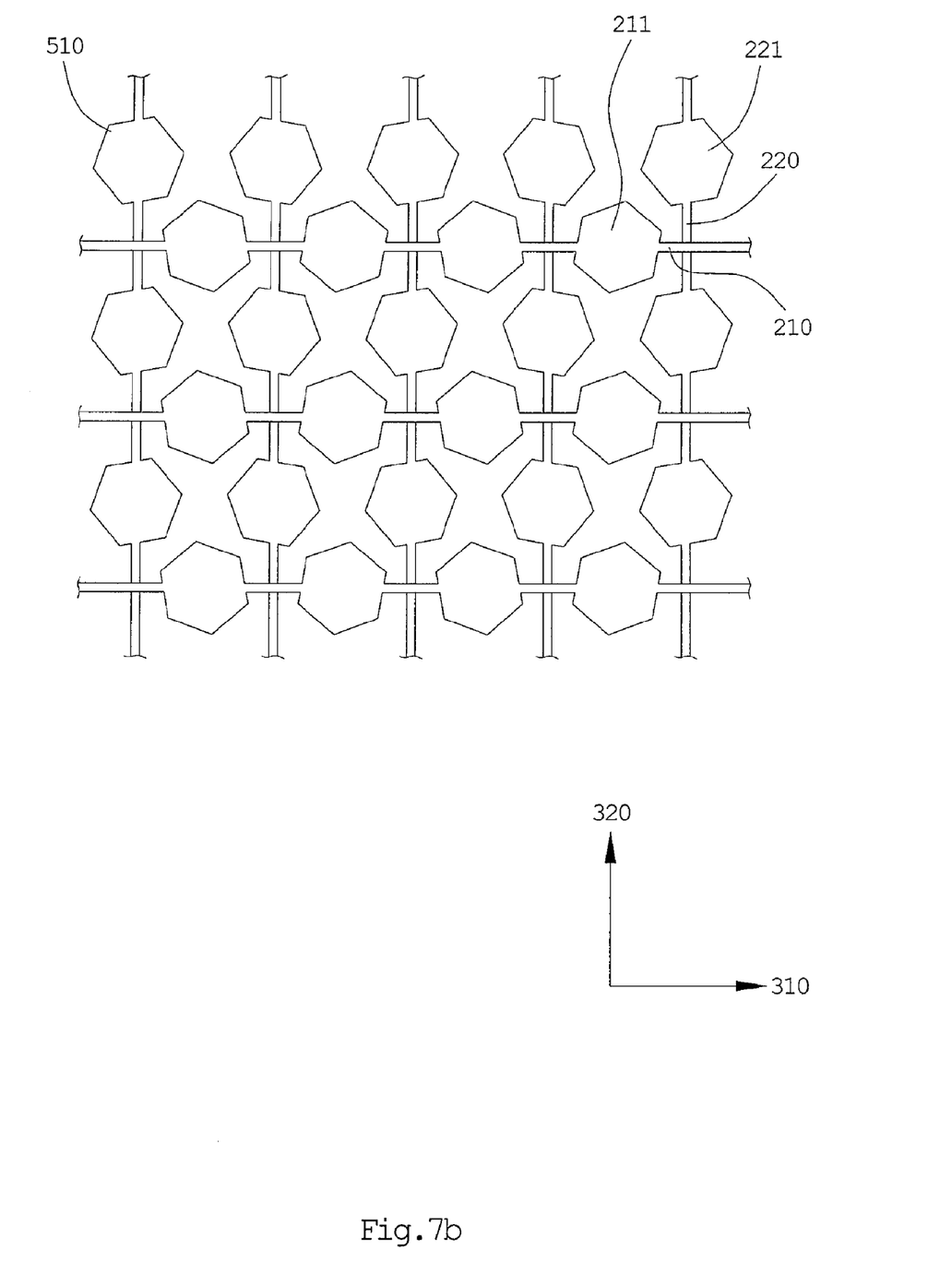

As shown in said embodiments, the first electrode 211 is preferred to be disposed symmetrically with respect to the first direction 310 or to the second direction 320. However, in different embodiment shown in FIG. 7a, the first electrode 211 can be rotated by certain angle with respect to the first direction 310, second direction 320 or the centre of the first electrode. Furthermore, in the embodiment shown in FIG. 7b, the adjacent first electrodes 211 can each be rotated in different angle. However, the width of rotated first electrode 211 is still reduced from the middle of the rotated first electrode to two sides of the rotated first electrode along the second direction 320. In this way the section of first electrode 211 distant from the middle section and stretching into the space between two adjacent Second electrodes 221 will have smaller width than the rest of first electrode 211.

Figure 8:
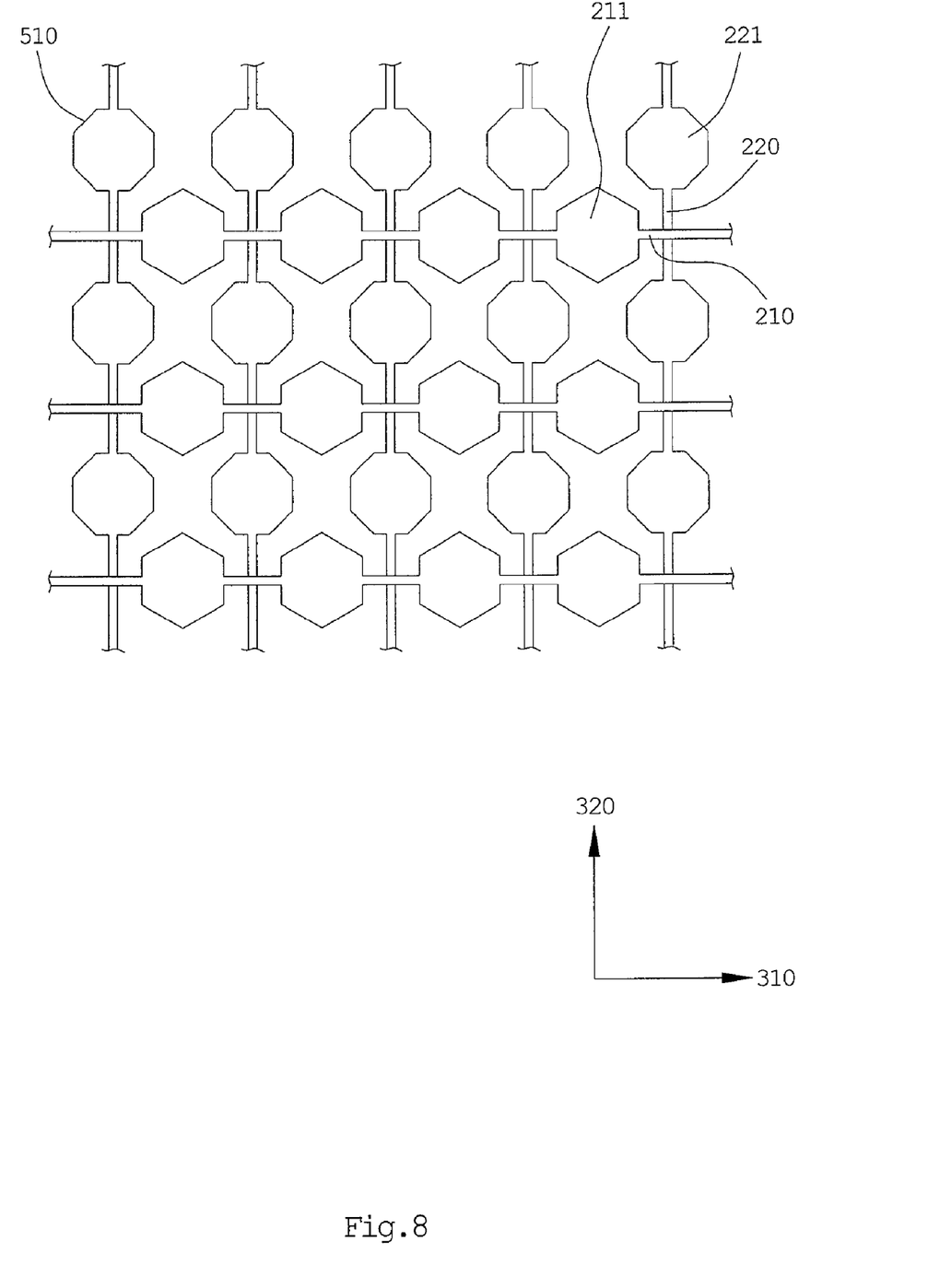
FIG. 8 and FIG. 9 are top views of an embodiment of the first electrodes and second electrodes adopting different designs.
Figure 9:
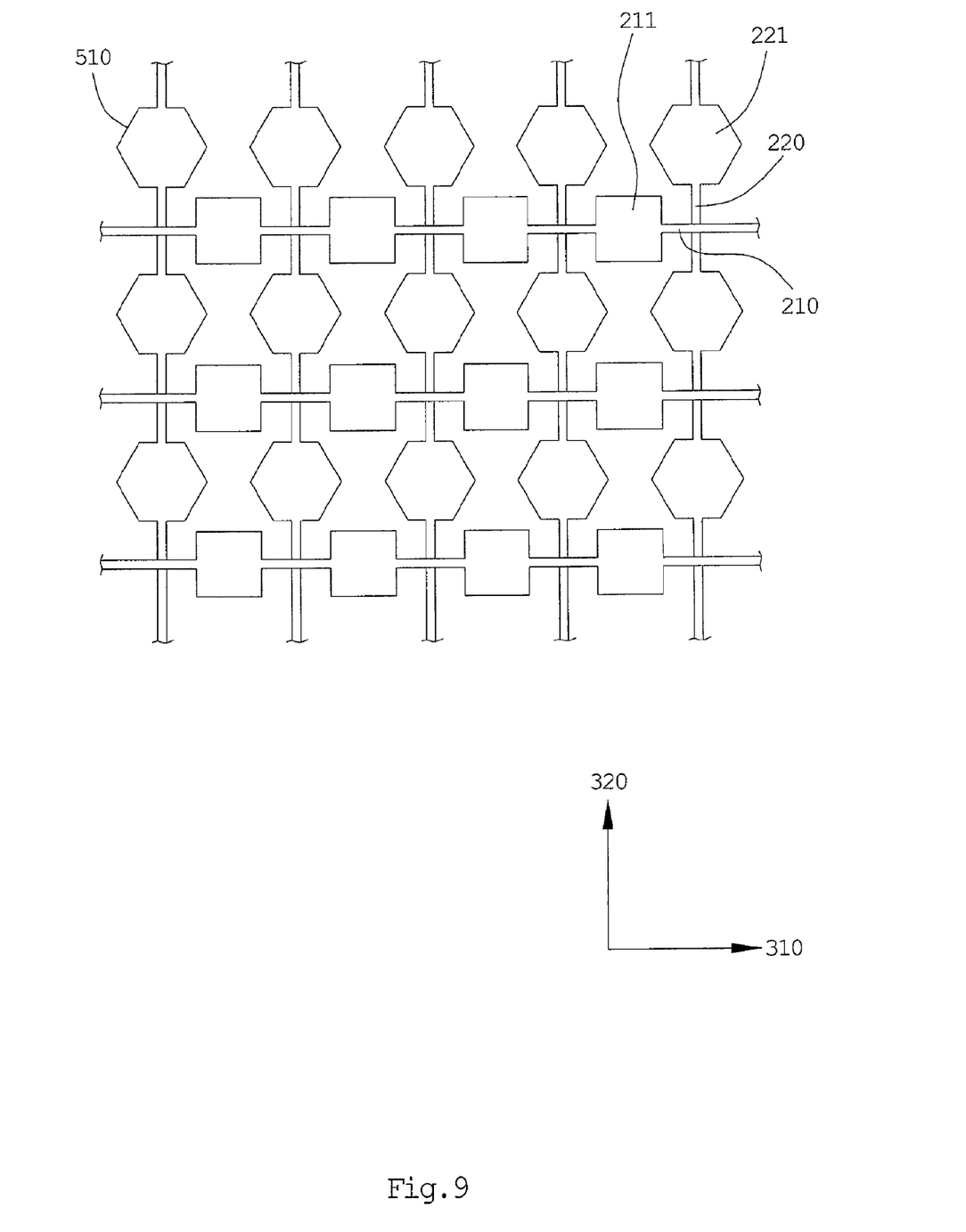

In the said embodiments, the Second electrodes 221 use the shape design of the first electrode 211. However, in different embodiment shown in FIG. 8, the second electrode 221 may adopt shape designs different to that of the first electrodes 211. The width of second electrode is reduced from the middle section of the second electrode 221 to two sides of the second electrode. In this way the section of second electrode distant from the middle of second electrode 221 and stretching into the space between two adjacent first electrode 211 will have smaller width than the rest of second electrode 221. In the embodiment shown in FIG. 9, the first electrode 211 of the present invention may be shaped in accordance with the second electrodes 221 of uniform width and still achieves the objective of reducing the lateral capacitance.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A capacitive touch panel comprising:
 a plurality of first direction electrode strings, wherein a plurality of first electrodes are disposed on each of the first direction electrode strings;
 a plurality of second direction electrode strings, wherein a plurality of second electrodes are disposed on each of the second direction electrode strings, and each of the second electrodes is disposed between the first electrodes of the adjacent first direction electrode strings, the closest distance between the first electrode and the adjacent first electrode ranges from 10-100 micrometers; and
 a dielectric layer disposed between the first direction electrode strings and the second direction electrode strings;
 wherein the width of the first electrode decreases from middle of the first electrode to two sides of the first electrode, each of the first electrodes includes a perimeter, and a quarter of the perimeter closest to and facing a quarter of a perimeter of the second electrode has a first slope change rate and a different second slope change rate, the quarter of the perimeter of the first electrode includes a first line segment and a second line segment, the first line segment and the second line segment are not parallel to the quarter of the perimeter of the corresponding second electrode; a first distance between the first line segment of the quarter of the perimeter of the first electrode and the nearest quarter of the perimeter of the adjacent second electrode varies as a line segment of the quarter of the perimeter of the second electrode extends; a second distance between the second line segment of the quarter of the perimeter of the first electrode and the nearest quarter of the perimeter of the adjacent second electrode varies as a line segment of the quarter of the perimeter of the second electrode extends; the first distance and the second distance have different change rate.

2. The capacitive touch panel of claim 1, wherein the second direction electrode strings cross the first direction electrode strings.

3. The capacitive touch panel of claim 1, wherein each of the second electrodes is disposed between the adjacent first electrodes.

4. The capacitive touch panel of claim 1, further comprising an overlapping a first electrode layer and a second electrode layer, wherein the first electrode strings and the second electrode strings belong to the first electrode layer and the second electrode layer respectively.

5. The capacitive touch panel of claim 1, wherein the first electrode is of a polygon with at least five sides.

6. The capacitive touch panel of claim 1, wherein the perimeter of first electrode includes a plurality of straight lines and each of the straight lines has a different slope.

7. The capacitive touch panel of claim 1, wherein the perimeter of the first electrode includes a plurality of arc-shaped lines and each of the arc-shaped lines has a different curvature.

8. The capacitive touch panel of claim 1, wherein each of the first electrodes is disposed between the adjacent second direction electrode strings, each of the second electrodes has a perimeter, and a quarter of the perimeter closest to and facing the first electrode has a first slope change rate and a different second slope change rate.

9. The capacitive touch panel of claim 8, wherein each of the second electrodes is a polygon of at least five sides.

10. The capacitive touch panel of claim 8, wherein the perimeter of second electrode includes a plurality of straight lines, and each of the straight lines has a different slope.

11. The capacitive touch panel of claim 1, wherein a closest distance between the first electrode and the adjacent second electrodes lies in between 1 and 1000 micrometers.

12. The capacitive touch panel of claim 11, wherein the closest distance between the first electrode and the adjacent second electrodes lies in between 10 and 100 micrometers.

13. A capacitive touch panel comprising:
 a plurality of first direction electrode strings, wherein each of the first direction electrodes strings includes a plurality of first electrodes;
 a plurality of second direction electrode strings, wherein each of the second direction electrode strings includes a plurality of second electrodes disposed between the adjacent first direction electrode strings, the closest distance between the first electrode and the adjacent first electrode ranges from 10-100 micrometers; and a dielectric layer disposed between the first direction electrode strings and the second direction electrode strings;

wherein the first electrodes are polygons except for quadrilaterals, each of the first electrodes includes a perimeter, and a quarter of the perimeter closest to and facing a quarter of a perimeter of the second electrode has a first line segment and a second line segment, the first line segment and the second line segment are not parallel to the quarter of the perimeter of the corresponding second electrode; a first distance between the first line segment of the quarter of the perimeter of the first electrode and the nearest quarter of the perimeter of the adjacent second electrode varies as a line segment of the quarter of the perimeter of the second electrode extends; a second distance between the second line segment of the quarter of the perimeter of the first electrode and the nearest quarter of the perimeter of the adjacent second electrode varies as a line segment of the quarter of the perimeter of the second electrode extends; the first distance and the second distance have different change rate.

14. The capacitive touch panel of claim 13, wherein the second direction electrode strings cross the first direction electrode strings.

15. The capacitive touch panel of claim 13, wherein the second electrode is disposed between the adjacent first electrodes.

16. The capacitive touch panel of claim 13, further comprising a first electrode layer overlapping a second electrode layer, wherein the first direction electrode strings and the second direction electrode strings belong to the first electrode layer and the second electrode layer respectively.

17. The capacitive touch panel of claim 13, wherein the first electrode is of a polygon with at least five sides.

18. The capacitive touch panel of claim 13, wherein each of the first electrodes is disposed between the adjacent second direction electrode strings, the second electrodes are polygons except for quadrilaterals.

19. The capacitive touch panel of claim 18, wherein the second electrode is a polygon of at least five sides.

20. The capacitive touch panel of claim 13, wherein the closest distance between the first electrode and the adjacent second electrodes lies in between 1 and 1000 micrometers.

21. The capacitive touch panel of claim 20, wherein the closest distance between the first electrode and the adjacent second electrodes lies in between 10 and 100 micrometers.

22. A capacitive touch panel comprising:

a plurality of first direction electrode strings, wherein a plurality of first electrodes are disposed on each of the first direction electrode strings;

a plurality of second direction electrode strings, wherein a plurality of second electrodes are disposed on each of the second direction electrode strings, and each of the second electrodes is disposed between the first electrodes of the adjacent first direction electrode strings; and a dielectric layer disposed between the first direction electrode strings and the second direction electrode strings;

wherein width of the first electrode decreases from middle of the first electrode to two sides of the first electrode along the second direction, each of the first electrodes includes a perimeter, and a quarter of the perimeter closest to and facing a quarter of a perimeter of the second electrode has a first slope change rate and a different second slope change rate, a projection of the quarter of the perimeter of the first electrode and a projection of the quarter of the perimeter of the second electrode on the dielectric layer are asymmetrical, wherein the first electrodes are polygons except for quadrilaterals; a distance between a line segment of the quarter of the perimeter of the first electrode and the nearest quarter of the perimeter of the adjacent second electrode varies and has different change rate as a line segment of the quarter of the perimeter of the second electrode extends.

23. A capacitive touch panel comprising:

a plurality of first direction electrode strings, wherein each of the first direction electrodes strings includes a plurality of first electrodes;

a plurality of second direction electrode strings, wherein each of the second direction electrode strings includes a plurality of second electrodes disposed between the adjacent first direction electrode strings; and a dielectric layer disposed between the first direction electrode strings and the second direction electrode strings;

wherein the first electrodes are polygons except for quadrilaterals, each of the first electrodes includes a perimeter, a quarter of the perimeter of the first electrode faces a quarter of a perimeter of the second electrode, a projection of the quarter of the perimeter of the first electrode and a projection of the quarter of the perimeter of the second electrode on the dielectric layer are asymmetrical, wherein a distance between a line segment of the quarter of the perimeter of the first electrode and the nearest quarter of the perimeter of the adjacent second electrode varies and has different change rate as a line segment of the quarter of the perimeter of the second electrode extends.

* * * * *